United States Patent

Galarneau et al.

[11] Patent Number: 5,630,902
[45] Date of Patent: May 20, 1997

[54] APPARATUS FOR USE IN HIGH FIDELTY REPLICATION OF DIFFRACTIVE OPTICAL ELEMENTS

[75] Inventors: Lynn Galarneau, Golden Valley; Daniel J. Rogers, White Bear Lake, both of Minn.

[73] Assignee: Honeywell Inc., Minneapolis, Minn.

[21] Appl. No.: 366,852

[22] Filed: Dec. 30, 1994

[51] Int. Cl.$^6$ .................................................. B32B 31/00
[52] U.S. Cl. ............................... 156/379.8; 156/379.6; 425/174.4
[58] Field of Search .............................. 152/379.6, 379.8, 152/380.6, 380.9, 381, 580, 583.1; 264/1.38, 1.7, 1.27, 1.31, 1.34, 1.36; 425/174.4

[56] References Cited

U.S. PATENT DOCUMENTS

| | | | |
|---|---|---|---|
| 5,098,508 | 3/1992 | Mattil | 156/363 |
| 5,228,947 | 7/1993 | Churchland | 156/580.1 |
| 5,300,190 | 4/1994 | Sugimoto et al. | 156/653 |

FOREIGN PATENT DOCUMENTS 2034542  1/1991  Canada.

OTHER PUBLICATIONS

F. Shvartsman, Replication of Diffractive Optics, Critical Reviews on Diffractive and Miniaturized Optics, SPIE vol. CR49, 1993.

*Primary Examiner*—James Sells
*Attorney, Agent, or Firm*—Ian D. Mackinnon

[57] ABSTRACT

An apparatus for replicating diffractive optical elements by embossing a master optical element into a photopolymer material disposed on a substrate, including a fixture for retaining, aligning, and conveying radiation to the embossing sample so that the photopolymer cures under pressure. Intermediate nickel optical elements may be used in lieu of quartz optical masters. The liquid processing techniques disclosed herein allow the replication of diffractive optics on curved substrates. This additional advantage eliminates the need for a plano optical interface further reducing the element count for a given optical system.

15 Claims, 3 Drawing Sheets

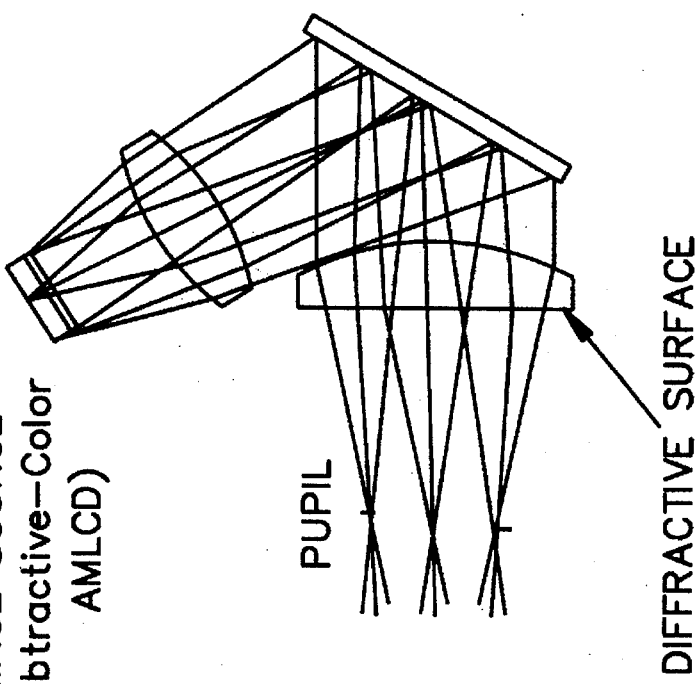
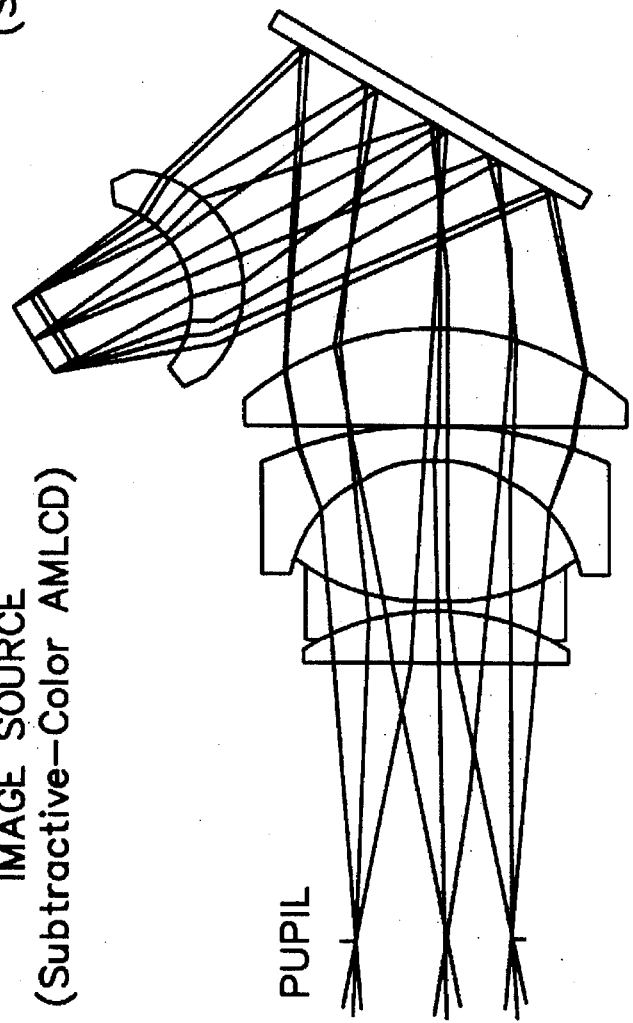
Fig. 3

APPARATUS FOR USE IN HIGH FIDELITY REPLICATION OF DIFFRACTIVE OPTICAL ELEMENTS

CROSS REFERENCE TO RELATED APPLICATION

The present patent application is related to Ser. No. 08/366,853 titled "Scale-up Process for Replicating Large Area Diffractive Optical Elements," filed on even day herewith, of common ownership and inventorship, and is hereby incorporated by reference.

1. Field of the Invention

This invention relates to an apparatus for replicating diffractive optic elements, and particularly, impressing a master element into a radiation curable liquid photopolymer disposed on a resin substrate to generate high quality reproductions of the master element.

2. Background of the Invention

In the past ten years, diffractive optics technology has evolved from a novel area of research to a new and powerful tool for optical designers. Major technical advances in diffractive optics technology include low cost alternatives to aspheric lenses, new solutions to aberration correction of refractive optic elements, and new devices such as moth's eye structures and beam multiplexers.

The innovation of the apparatus herein disclosed compared to the prior art is the application of replication to diffractive optical elements without significant image distortion. In the present state of the art, replication is not commonplace for diffractive optics, perhaps due primarily to the poor image quality usually resulting from the prior art approaches to replicating diffractive optic elements.

Conventional fabrication techniques for diffractive optics include diamond turning, semiconductor mask/etch processing, and injection molding. Except for injection molding, these fabrication techniques are very expensive and injection molding is only applicable to plastics. The present invention avoids this and offers dramatically reduced manufacturing costs and also provides additional weight reduction with a high fidelity replication process wherein a photopolymer material receives an impression of a diffractive pattern from a master element bearing an inverted diffraction pattern, the photopolymer is then cured with radiation while under pressure.

Using the present invention, diffractive optical elements may be integrated into various other useful optical systems, such as displays, or when used in combination with refractive optics the method offers advantages of size, weight, and cost reduction over conventional optical systems. In addition, the present invention introduces new design flexibility into solutions of complex optical systems. For example, the present invention enables mass production of diffractive optical elements for non-imaging applications, such as wire grid polarizers, microlens arrays, Dammann gratings, and moth-eye AR surfaces, to name a few possible commercial applications involving use of the present invention.

SUMMARY OF THE INVENTION

A unique fixture apparatus for use in a low cost process for replicating diffractive optics using radiation curable liquid photopolymers on resin substrates. The process may be appreciated with reference to prototypes of two and eight level f/10 quartz master elements that are embossed into liquid photopolymers and subsequently cured under pressure in combination with incident high intensity ultraviolet (UV) radiation. The quartz master easily separates from the resulting hardened replica and the quartz master is thereafter immediately available for reuse.

High fidelity replication of surface relief structures may be verified using an optical microscope, a Scanning Electron Microscope (SEM), or a 2D scanning profilometer. Nearly theoretical diffraction efficiency (39.4% vs. 40.5%) has been achieved with the two (2) level f/10 replica. One replica made according to the present invention was inspected, and the optical image quality was found to be slightly degraded, possibly due to warping and submicron surface roughness (as evidenced by increasing distortion of a blur spot over larger replica diameters). Measurements of replicas made in accord with the present invention have shown less than 10% shrinkage in the vertical plane, with no shrinkage measured in the horizontal plane.

In one embodiment, an intermediate nickel electroform is used to produce high quality cured photopolymer replicas of an original master element that was first replicated in nickel. The nickel electroform is then used over and over again in conjunction with the apparatus to produce a number of identical cured photopolymer replicas, as the nickel electroform is extremely durable and can be used for single element pattern transfer/embossing into the final desirable material for almost any given product or application. For the preferred embodiment a quartz master is used. Quartz masters are significantly more durable and potentially more accurate than nickel electroform masters for obtaining the highest optical image quality. It is recognized that high optical quality substrates are preferred to approach the level of performance delivered via appropriate use of a quartz master.

Diffractive replication on glass substrates as well as resins or plastics has been successfully performed. Assorted high quality optical epoxies and hard coats and associated release agents that have been proven for conventional replication processes can be considered a preferred material for use with the present invention. These typically can and will include some of the replication epoxies that have only recently been introduced to the market as substitutes for conventional optics such as Epo-tek epoxy 301-2, made by Epoxy Technologies, Inc. Further examples of materials suitable for the replication process herein disclosed include hard coats such as Gafgard 233, by GAF Corporation, and Morton Thiokol ZM-1819, by Morton-Thiokol Corporation. These materials are preferred for replication because of their low shrinkage rates during and after photocuring, good adhesion characteristics to materials such as polycarbonate and polymethylacrylate (acrylic) and their high moisture resistance and solvent resistance. Use of materials consisting of 100% solids is preferable to ensure that no volatiles are given off during curing.

Release agents may be necessary for certain material systems to allow separation of the replica element from the master and are applied before the master element is embossed into the photopolymer layer on a substrate. The release agent is preferably applied in a uniform layer so that the photopolymer easily separates from the master element.

In general, replication begins by impressing a standard quartz or metal master element that bears a desired diffraction pattern (e.g., f/10, 2-level lens) on a side of the master into a relatively uniform layer of photopolymer material disposed on a substrate material (i.e., resin, plastic, glass, etc.). The type of substrate chosen is usually dictated by the photopolymer epoxy/hard coat chosen and the variety of adhesion promoters available, if desired. The quality of the substrate used is very critical to the image quality obtained in the replica. The degree to which the replica retains the optical figure of the master depends predominately on the properties of the materials used, as well as the stability and the configuration of the substrate. A feature of the present invention is that it functions to hold the work piece without movement such that precise replication of the diffractive optical master is effected.

Some possible uses of the process disclosed herein involve creation of helmet mounted displays using hybrid refractive/diffractive elements. The system of the present invention provides an opportunity to demonstrate the significant payoffs that can be realized using replication technology. Also of significance is low cost optical readouts in which diffractive optics are used after being fabricated using the replication techniques herein. Speed of assembly, weight and cost savings can be realized with certain optical applications; for example, the assembly of LED lenses and fiber couplers will benefit from the low cost replicated diffractive optics disclosed and taught herein.

BRIEF DESCRIPTION OF THE DRAWINGS

FIG. 3 is a graphical depiction of two optical systems for a full-color head-mounted display, the first designed conventionally without use of diffractive optics, and the second designed using diffractive optics.

DESCRIPTION OF THE PREFERRED EMBODIMENT

Conventional fabrication techniques for diffractive optics include diamond turning, semiconductor mask/etch processing, and injection molding. Except for injection molding, these fabrication techniques are very expensive and injection molding is only applicable to plastics. Manufacturers can dramatically increase manufacturing speed, reduce manufacturing costs, and provide additional weight reduction, using the high fidelity replication process facilitated by the apparatus of the present invention.

Figure 1:
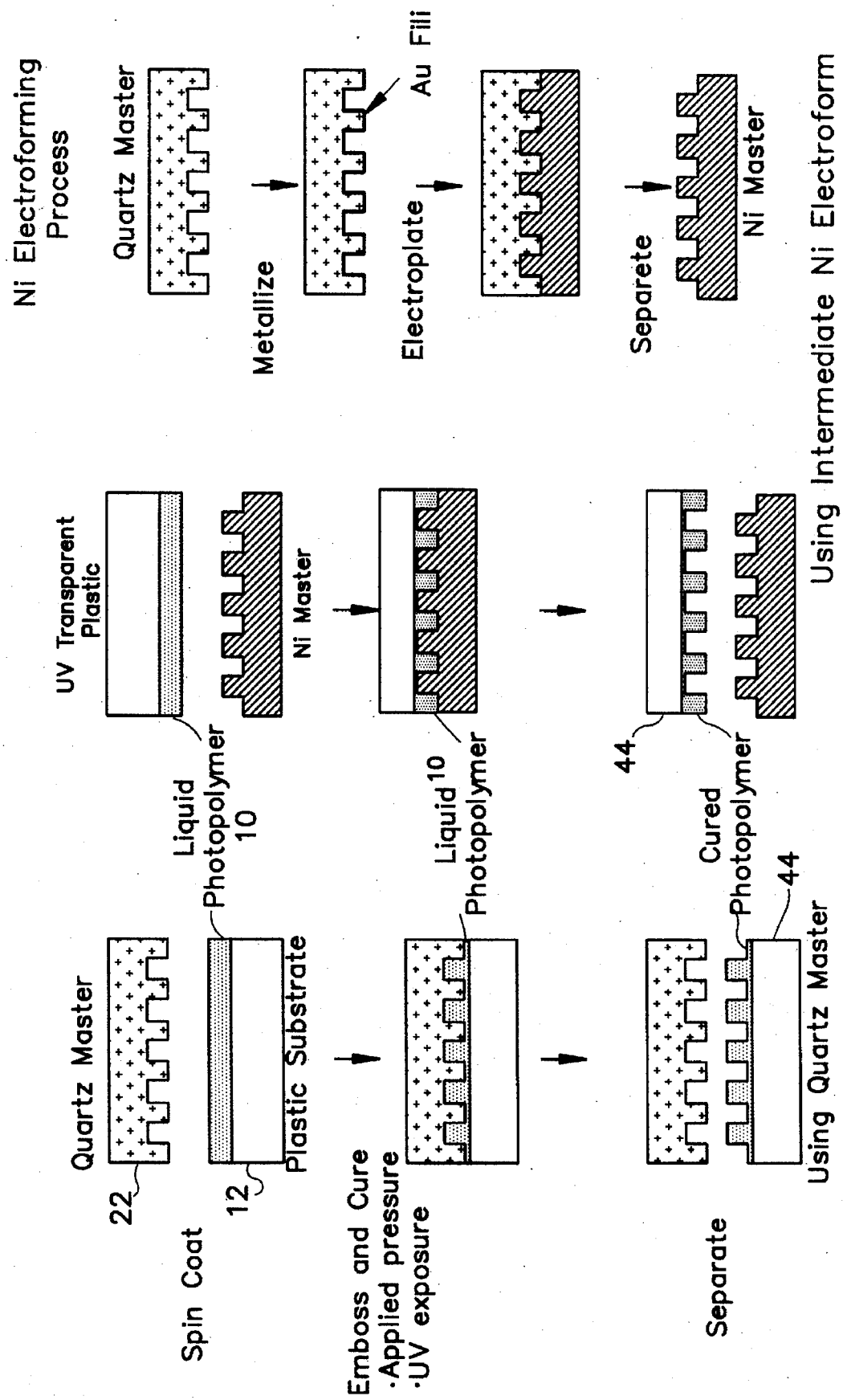
FIG. 1 depicts the replication processes of the present invention utilizing a quartz master, a nickel master, and the nickel electroforming process used to derive a nickel master from a quartz master.
Figure 2:
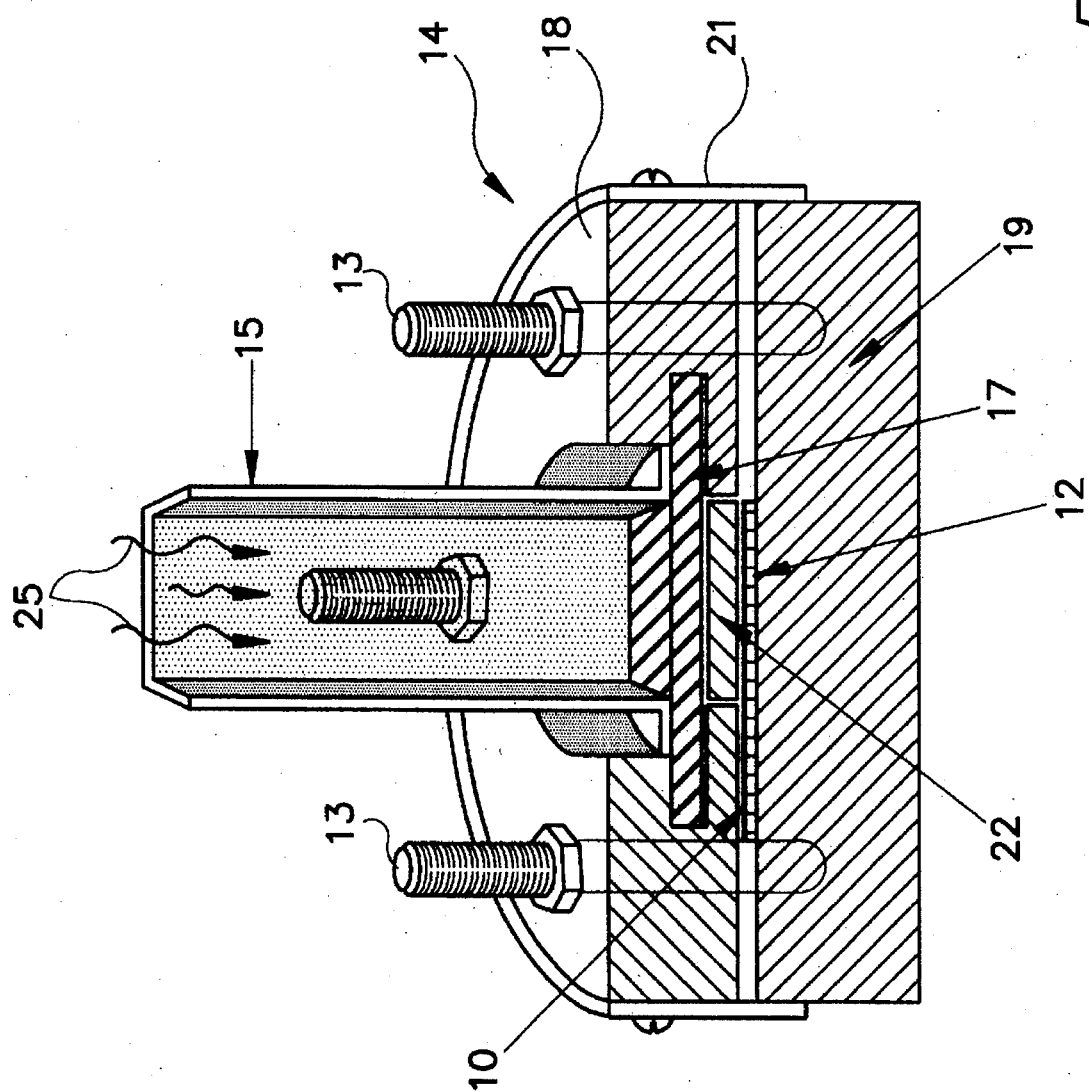
FIG. 2 is an elevational side view in cross section showing one embodiment of the fixture specially suited for use with the present invention to replicate high fidelity diffractive optical elements.

In accord with the present invention as depicted in FIG. 2 and using UV curable photopolymer materials, extremely high fidelity replicas can be made from master optical elements made for example from quartz or nickel masters. With a quartz master, the diffractive pattern is embossed into liquid resin which has been spin coated or dipped onto a substrate member. In the case of a nickel master, a UV transparent plastic substrate is required for curing because the nickel master blocks the UV radiation. After curing, the master can be physically separated from the replica, leaving both intact and the master ready for subsequent replications. Accordingly, a person skilled in this art will have considerable experience with spin coating, dip coating and replication of thermal and radiation curable hard coats and epoxies used as scratch resistant coatings for plastic visors.

The replication quality achieved by the process of the instant invention depends upon several key parameters. These parameters include photopolymer material, spin coating time, spin coating speed, pressure applied, UV exposure intensity, UV exposure time, and separation technique.

The material chosen for this process was a radiation curable acrylate photopolymer. It is preferred for replication because of the excellent adhesion characteristics to plastics, the high moisture resistance, the solvent resistance, and the relatively low shrinkage upon curing. Preferably the photopolymer should comprise 100% solids, so that no volatiles are given off during cure. In one embodiment, the liquid photopolymer is flowed onto an acrylic or polycarbonate substrate and then spin coated at speeds of 750 rpm for about 7.5 seconds. Spin speeds greater than this can reduce the film thickness to make it too thin to allow for sufficient material coverage for high aspect ratio patterns. Coatings which are not spun on, but rather applied by dipping the substrate into a material, are usually too thick and produce a "crazed" structure upon curing, a "crazed" structure is characterized by cracks in the coating.

The apparatus depicted in FIG. 2 is used to produce the diffractive optic replicas in a sample consisting of a substrate 12 and a photopolymer 10. The combination of the fixture base 19 and the fixture cap 18 function to prevent relative motion between the quartz master 22 and the sample when the two parts of the apparatus are securely coupled together. Both the fixture base 19 and the fixture cap 18 possess shouldered apertures or raised templates into which the respective substrate 12 and quartz master 22 insert to prevent relative motion or slipping. The pattern sought to be replicated is embodied in the face of the master element 22.

To use the apparatus 14, the sample and the master element 22 are inserted into the base member 19 and the cap member 18 respectively which parts, in turn, are then coupled to each other via coupling means 13. Pressure is then applied with a hydraulic press, not shown, and the pressure is transmitted to the substrate 12 and master element 22 through a specially designed fixture 14 preferably having a quartz window 17 therein to allow radiation, shown by arrows 25, from a remote radiation source there through to impinge incident on the photopolymer 10 to allow curing of photopolymer 10 while the substrate 12 remains under pressure from the hydraulic press while being retained and aligned by the special fixture 14.

Typically a 300 W/in ultraviolet curing system is used to cure the photopolymer material 10, which usually finishes the curing step in less than twenty (20) seconds (assuming an exposure between 5–50 mJ/cm$^2$). In the preferred embodiment, a chimney is used as a conduit for the ultraviolet energy. The chimney acts to prevent exposure and subsequent curing of the sample areas not directly under the optical master element. The chimney is most useful where multiple adjacent replications are desired. Where only a single replication is needed, the chimney is unnecessary. After curing, the photopolymer material 10—which now comprises the replica 44—and substrate 12 are removed from the fixture 14 and separated from the master 22 using a sharp edged instrument, not shown, placed between the master 22 and the replica 44. The master 22 is then rinsed with acetone or other similar cleaning agent and is thereafter ready for another embossing.

Two and eight level quartz f/10's and various patterned Ni electroforms have been used as the replicating master elements. In one embodiment two- and eight-level quartz f/10 Fresnel phase lenses and various patterned Ni electroforms were used as the replicating masters.

While the present invention has been described with reference to certain embodiments, it will be apparent to one of skill in the art that various embodiments involving elements of design choice to such a person will come within the spirit and scope of the present invention as defined in the following claims.

We claim:

1. An apparatus for forming diffractive optical replicas from a sample consisting of a substrate member coated with a photopolymer material, comprising:

a base member having a first face for receiving a compressive force thereon and having a second face for aligning the sample thereon;

a master element having a face embodying a pattern being duplicated;

a cap member releasably coupled to said base member and having a shouldered aperture, said master element releasably coupled to the shouldered aperture in said cap member; and window means for transmitting radiation therethrough, said window means coupled to said shouldered aperture in said cap member.

2. The apparatus of claim 1, further comprising an alignment girdle disposed around the periphery of said cap member and said base member for further aligning the sample residing upon said base member.

3. The apparatus of claim 1, further comprising a radiation opaque layer disposed around the perimeter of said master element.

4. The apparatus of claim 1 or 3, wherein said master element is made of either quartz or nickel.

5. The apparatus of claim 1, wherein said base member is made of a radiation transmitting material.

6. The apparatus of claim 1, wherein said master element has a metal layer disposed said patterned face of said master element.

7. The apparatus of claim 1, further comprising a plurality of nut and bolt combinations for coupling said cap member to said base member.

8. An apparatus for retaining a layered sample, aligning at least two layers of a layered sample, and conveying radiation to a layered sample, comprising:

a base member having a recess in one side for receiving the layered sample;

a cap member having an aperture through a portion thereof;

a chimney member having a distal end and a proximal end, said chimney member coupled to said aperture in said cap member such that radiation incident at said distal end of the chimney member is conveyed to said proximal end of the chimney and impinges upon the layered sample with a limited angle of incidence; and, means for releasably retaining said base member to said cap member;

a master element embodying the pattern being duplicated, said master element releasably coupled to said aperture in said cap member.

9. The apparatus of claim 8, further comprising a secondary aligning means for holding the periphery of said base member and the periphery of said cap member in aligned communication.

10. The apparatus of claim 8 or claim 9, further comprising a window member located adjacent to said proximal end of said chimney member.

11. The apparatus of claim 8, wherein said master element is made of a metal.

12. The apparatus of claim 8 or 11, wherein said master element has a metallic layer disposed on said patterned face of said master element.

13. The apparatus of claim 8, wherein said means for releaseably retaining said cap member and said base member comprises a plurality of nut and bolt combinations disposed through opposing surfaces of said base member and said cap member.

14. The apparatus of claim 9, wherein said secondary aligning means comprises a metal strap coupling said base member and said cap member with screws.

15. The apparatus of claim 1, further comprising a hollow chimney member means, coupled to said window means on an opposing side of said cap member, for receiving radiation and conveying the radiation to the sample and limiting the radiation exposure angle.

* * * * *